United States Patent [19]

Barrera et al.

[11] Patent Number: 5,715,427
[45] Date of Patent: Feb. 3, 1998

[54] SEMI-ASSOCIATIVE CACHE WITH MRU/LRU REPLACEMENT

[75] Inventors: David Daniel Barrera, Austin, Tex.; Bahador Rastegar, deceased, late of Lynnwood, Wash., by Fatemeh Dashtestani, heir; Paul Charles Rossbach, Austin, Tex.

[73] Assignees: International Business Machines Corporation, Armonk, N.Y.; Motorola, Inc., Schaumburg, Ill.

[21] Appl. No.: 592,143

[22] Filed: Jan. 26, 1996

[51] Int. Cl.$^6$ ................................................. G06F 12/08
[52] U.S. Cl. ........................... 395/463; 395/455; 395/471
[58] Field of Search ............................. 395/460–463, 395/468–473, 455, 403, 435, 440

[56] References Cited

U.S. PATENT DOCUMENTS

| | | | |
|---|---|---|---|
| 5,073,891 | 12/1991 | Patel | 371/21.3 |
| 5,325,511 | 6/1994 | Collins et al. | 395/455 |
| 5,467,460 | 11/1995 | Patel | 395/470 |
| 5,584,013 | 12/1996 | Cheong et al. | 395/449 |
| 5,638,531 | 6/1997 | Crump et al. | 395/450 |

FOREIGN PATENT DOCUMENTS 432524   6/1991   European Pat. Off. .

*Primary Examiner*—Matthew M. Kim
*Attorney, Agent, or Firm*—Lee E. Chastain; Andrew J. Dillon

[57] ABSTRACT

A cache memory uses content-addressable tag-compare arrays (CAM) to determine if a match occurs. In a semi-associative instruction cache, with the CAM and eight cache lines grouped together to form camlets, a binary index is used to address one camlet in the cache array, and the effective address tag match is used to select a potential line within the camlet in accessing data stored in the cache array. Since an E-tag match causes that cache line's wordline to activate, proper cache operation requires that no two (or more) E-tags within a camlet have the same match criteria (ECAM entry); the invalidation of entries is done to prevent this from happening. Due to the mapping of the effective address into the E-tag CAM and the camlet binary index, addresses that are 1-Meg apart point to the same camlet and have the same ECAM tag. The method thus employs a semi-associative cache having cache lines configured in camlets of, for example, eight lines per camlet. An LRU indication is stored in each camlet showing which line was least-recently-used. Upon occurrence of a cache replacement operation, it is determined whether or not a replacement line has a tag matching a line that is already in the camlet, and, if so, this line is invalidated and it is indicated to be the least-recently-used line. The next replacement goes to this line, whereas otherwise it would have appeared to be the most-recently-used since its wordline went high for the invalidate operation.

10 Claims, 7 Drawing Sheets

| LRU BIT | Oldest Entry |
|---|---|
| TOP = 0 | 0,1,2,3 |
| TOP = 1 | 4,5,6,7 |
| MID0 = 0 | 0,1 |
| MID0 = 1 | 2,3 |
| MID1 = 0 | 4,5 |
| MID1 = 1 | 6,7 |
| LOW0 = 0 | 0 |
| LOW0 = 1 | 1 |
| LOW1 = 0 | 2 |
| LOW1 = 1 | 3 |
| LOW2 = 0 | 4 |
| LOW2 = 1 | 5 |
| LOW3 = 0 | 6 |
| LOW3 = 1 | 7 |

| Existing LRU bits: | Replace: |
|---|---|
| 0<br>0 x<br>0 x x x | 0 |
| 0<br>0 x<br>1 x x x | 1 |
| 0<br>1 x<br>x 0 x x | 2 |
| 0<br>1 x<br>0 1 x x | 3 |
| 1<br>x 0<br>x x 0 x | 4 |
| 1<br>x 0<br>x x 1 x | 5 |
| 1<br>x 1<br>x x x 0 | 6 |
| 1<br>x 1<br>x x x 1 | 7 |

*Fig. 6a*

| Cache Hit on: | Set LRU Bits: |
|---|---|
| 0 | 1<br>1 x<br>1 x x x |
| 1 | 1<br>1 x<br>0 x x x |
| 2 | 1<br>0 x<br>x 1 x x |
| 3 | 1<br>0 x<br>x 0 x x |
| 4 | 0<br>x 1<br>x x 1 x |
| 5 | 0<br>x 1<br>x x 0 x |
| 6 | 0<br>x 0<br>x x x 1 |
| 7 | 0<br>x 0<br>x x x 0 |

*Fig. 6b*

SEMI-ASSOCIATIVE CACHE WITH MRU/LRU REPLACEMENT

BACKGROUND

1. Technical Field

The present invention relates in general to data processing systems and in particular to cache memory systems for high speed processors. Still more particularly, the present invention relates to semi-associative cache memory devices using content-addressable tag compare, and having a mechanism for replacement of cache lines based on a most recently used/least-recently-used (MRU/LRU) algorithm.

2. Description of the Related Art

In co-pending application Ser. No. 08/176,812, filed Jan. 3, 1994, now U.S. Pat. No. 5,550,995, issued on Aug. 27, 1996, by Barrera et al., for "Memory Cache and Method of Operation" a semi-associative cache for a processor system is described employing a method for invalidating cache lines which are duplicated within an address block in the cache array.

Semi-associative caches employ content-addressable memory (CAM) technology in order to narrow down the identify of the desired cache line to a single cache line before the real address is known. The validity of the data associated with the single cache line is determined by comparing its address tag to the effective address for the incoming memory request. Semi-associative caches are able to maintain many of the advantages of N-way set associative caches.

In the cache described in U.S. Pat. No. 5,550,995, two tags are stored for each cache line, a E-tag (stored in an ECAM) and an R-tag. The E-tag is a subset of the effective address of the cache line, and the R-tag is a subset of the real address of this cache line. When the processor needs a particular address location, it indexes into the cache using bits from the effective address, and tries to match a tag from the effective address with the E-tags stored in a "camlet" selected by the indexing. The number of entries in a camlet determines the way associativity of the cache. One or none of the E-tags in a particular camlet may match the tag from the effective address. A match indicates that the requested data may be in the cache line associated with the matched E-tag. The effective address must be translated into a real address and the real address compared to the R-tag of the matching cache line to determine if a full cache hit is appropriate.

Semi-associative caches exhibit a condition known as "cache aliasing" and known solutions to this condition themselves cause problems. Cache aliasing occurs when two or more entries in a camlet have the same E-Tag. This is especially acute after a cache request resulting in an E-tag hit and an R-tag miss. In this case, the cache must fetch data from main memory that will have, by definition, the same E-tag as the half-matching cache line. If the memory cache replacement mechanism places this data directly into another cache line in the same camlet, then a cache alias condition will occur. The next request for this new data or for the data associated with the half-match will cause two CAMs to match and output their cache lines and R-tags, causing an inoperable condition.

Prior solutions to the cache aliasing condition required that a cache line immediately be invalidated after it generated the combination of an E-tag hit and an R-tag miss. This solution does preclude two camlet entries from ever having the same E-tag. However, this invalidated cache line may be useful to the data processor while memory cache is fetching the previously requested cache line, or if the fetched line was not actually needed (i. e., when a pre-fetched branch target was found to be not used when the branch condition was not met). The cache will be busy for one clock cycle during the invalidation step, and this cycle might otherwise be useful for other accesses to the cache. Also, this solution leads to added cache control logic complexity.

According to the embodiment disclosed in U.S. Pat. No. 5,550,995, a method for invalidating the aliased cache line in the above situation during the same clock cycle as the condition occurs, using offset checking logic, is disclosed. The need for a separate, dedicated, invalidation cycle was thus eliminated, and simpler control circuitry could be used, needing less space on the chip. The cache was always available for useful read/write operations, and invalidation of an aliased entry occurred only when absolutely necessary. As used here, the term "aliased" includes the condition where two identical tags in a camlet would be 1-Meg apart; the circuitry to avoid this condition is referred to below as "1-Meg offset checking logic."

A cache control circuit is constructed to use a selected algorithm for determining which cache line to replace when a cache miss occurs and a new line is fetched from memory. Typically, a LRU or least-recently-used algorithm is employed. A replacement algorithm that relied only upon LRU would result in a compromise in performance if no provision were made for checking for invalid entries. If a cache line has been invalidated, the most efficient replacement algorithm would treat this invalid line as the one to be replaced. Snoop circuitry is often used to invalidate cache lines when an access to main memory is made by another resource on the system bus (usually this does not need to be taken into account in an instruction cache). Cache lines are also invalidated by instructions which invalidate a specified block of the memory address range. There is a trade-off involving chip area and speed, when selecting the actual replacement algorithm to be implemented in a given design. For example, snoop invalidations are not of major concern given that entries that are snoop-invalidated tend to be old compared to the typical replacement of cache entries, therefore the LRU algorithm should point to these snoop-invalidated entries soon anyway; snoop invalidation can thus be ignored with no significant penalty.

SUMMARY

It is therefore one object to provide an improved cache memory for a high-speed data processing system.

It is another object to provide an improved semi-associative cache memory of high performance and yet simplified in design.

The above as well as additional objects, features, and advantages will become apparent in the following detailed written description.

In the instruction cache for a microprocessor using the method of U.S. Pat. No. 5,550,995, cache line entries are invalidated by the 1-Meg offset checking logic. This 1-Meg offset invalidation (due to the 8-bits of the E-tag having to be unique within each camlet) happens to any kind of entry, new or old. In the replacement method herein described, invalidations due to the 1-Meg offset condition are accounted for, but the invalidations due to snoops are ignored as a minor performance impediment. Taking into account 1-Meg invalidations requires addition of only inconsequential chip area for the logic circuitry needed. During the cycle where the 1-Meg scenario is detected, the instruction cache arranges the LRU bits so that the next replacement points to the entry that was just invalidated by the 1-Meg problem, i.e., the opposite of LRU so it is termed "most recently used" or MRU. Normally, the LRU bits get updated due to the wordline being active during this 1-Meg offset invalidate cycle, but by just inverting the update LRU bits during the 1-Meg scenario, the bits automatically point to (for the next replacement) the line that is just being invalidated. Implementing this replacement method uses circuitry that results in a very small chip area increase from the previous replacement logic, and yet ensures that the invalidated entry (cache line) is replaced next, instead of it being considered a "recently used" entry and getting replaced last.

According to the present improvement, a cache memory uses content-addressable tag-compare arrays (CAM) to determine if a match occurs. In a semi-associative instruction cache, with the CAM and eight cache lines grouped together to form camlets, a binary index is used to address one camlet in the cache array, and the effective address tag match is used to select a potential line within the camlet in accessing data stored in the cache array. Since an E-tag match causes that cache line's wordline to activate, proper cache operation requires that no two (or more) E-tags within a camlet have the same match criteria (ECAM entry); the invalidation of entries as described in U.S. Pat. No. 5,550,995 is done to prevent this from happening. Due to the mapping of the effective address into the E-tag CAM and the camlet binary index, addresses that are 1-Meg (or a multiple of 1-Meg) apart point to the same cam let and have the same ECAM tag.

The method herein thus employs a semi-associative cache having cache lines configured in camlets of, for example, eight lines per camlet. A pseudo-LRU indication is stored in each camlet showing which line is less-recently-used. Upon occurrence of a cache replacement operation, it is determined whether or not a replacement line has a tag matching a line that is already in the caroler, and, if so, the line already in the cache having matching E-tag is invalidated, or, if not, the line in the camlet indicated to be least-recently-used is replaced. These steps of invalidating and modifying the LRU bits occur in a single clock cycle. The replacement occurs as normal or on a subsequent miss.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIGS. 6a and 6b are Tables of LRU bits under various replacement and cache-hit conditions;

DETAILED DESCRIPTION

Figure 1:
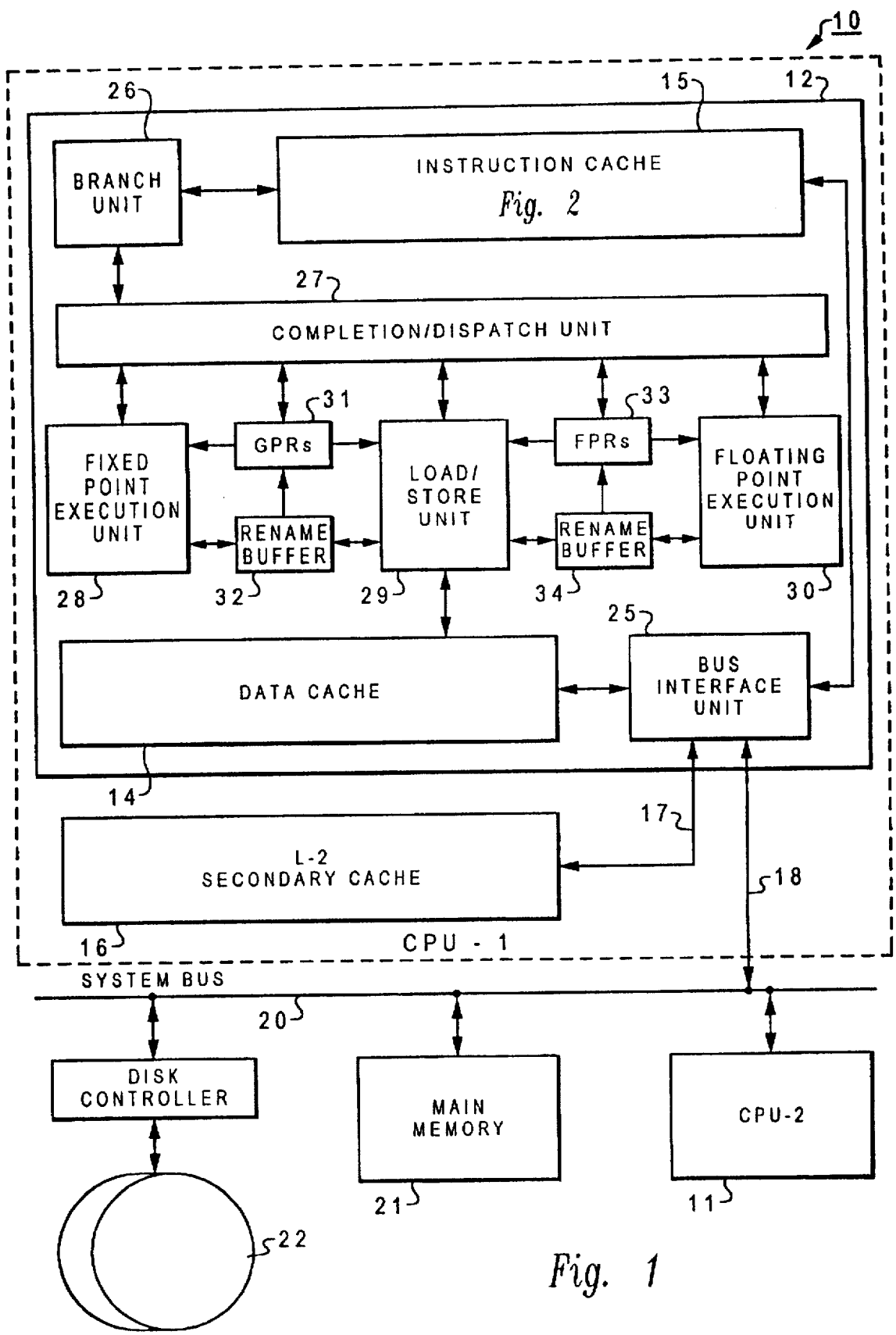
FIG. 1 is a block diagram of a data processing system of the type using a cache memory according to the illustrated.

Referring to FIG. 1, a data processing system of the type which may use a cache memory and cache replacement method according to an example embodiment is illustrated. Of course, it is understood that the features of the invention are useful in various systems, as primary (first level) cache or secondary cache, translation buffers, and the like, wherever high-performance content-addressable memory is useful, for example. In FIG. 1, two processors 10 and 11 are shown, although the features of this invention are also useful in a single processor system. The processor 10 has a CPU 12 which may be of the superscalar RISC type, for example, constructed as a single-chip device with an on-chip data cache 14 and an on-chip instruction cache 15 as described herein. The system of FIG. 1 has a hierarchical memory arrangement of first-level cache, secondary cache, main memory, and disk storage, as is the usual case. A secondary cache 16 is connected to the processor 12 by a local bus 17, and another set of lines 18 connect the processor chip 12 to a system bus 20. Main memory 21, coupled to the system bus, is also accessed by the processor 11, and so the issue of cache coherency arises for data in the caches 14 or 16. Mass storage is provided by hard disk 22, coupled to the system bus via a disk controller. The secondary cache 16 is usually much larger than the on-chip cache, and access to it is slower than to the on-chip caches 14 and 15. And, the cache 15 is addressed by effective (i.e., untranslated) addresses EA, while the off-chip memory including the secondary cache 16 and main memory 21 is usually addressed only by real addresses. The CPU is connected to the system bus 20 by a bus interface where translations in timing and controls are made to the system bus standards, different from the local bus protocol.

The memory for the data processing system of FIG. 1 is thus hierarchical from fastest to slowest, and from smallest to largest, and from most expensive (per byte) to least expensive, in profession from the on-chip caches 14 and 15, to the secondary cache 16, to the main memory 21, to the disk storage 22. The main memory 21 usually contains a subset of what is in the disk storage 22, the secondary cache 16 contains a subset of what is in main memory 21, and the on-chip caches 14 and 15 subsets of what is in the secondary cache. The CPU can access the on-chip caches 14 and 15 within one cycle, whereas it takes several cycles to access the secondary cache 16. If a cache miss occurs in primary and secondary caches, then the main memory 21 is accessed to do a cache replacement or cache fill operation, replacing a cache line with a "line" from main memory 21 which may be, for example, 1024-bits in length. This cache line contains the addressed data which caused the cache miss, i.e., this cache replacement operation is usually used to satisfy the attempted access for which a cache miss occurred. If the main memory 21 does not contain the location for which a cache fill is attempted, then a page containing this data is accessed from disk storage 22, then the cache fill is completed and the memory access satisfied. The time required to acquire a page from disk 22 and write it to main memory 21 would be many thousands of CPU cycles, during which the CPU is ordinarily switched to do another task, or stalled, waiting for the data to satisfy the request. For optimum performance, the object is for the caches 14 and 15 to contain the data most likely to be used next, and, using the principle of locality and immediacy, this is approximated by maintaining data in cache that is used more recently by the tasks executing on the CPU. Various algorithms are used in replacing pages in the main memory 21 with pages from the disk 22 to keep up with executing tasks, trying to anticipate what pages will be most likely used next, and thus minimizing the necessity to do a paging operation while the CPU waits for data to satisfy a memory request. The caches, likewise, should preferably keep up with the page replacements, storing data that is in the main memory. It is not practical from a performance standpoint to do this replacement in a deterministic way, so it is done by approximations, as will be explained.

Within the processor chip 12, a bus interface unit or BIU 25 is connected to the instruction cache 15 and to a data cache 14. Instruction cache 15 supplies an instruction stream to a branch unit 26 and to a completion/dispatch unit 27. Completion/dispatch unit 27 forwards individual instructions to an appropriate execution unit. Data processor 12 has a fixed-point execution unit 28, a load/store execution unit 29, and a floating-point execution unit 30. Fixed-point execution unit 28 and load/store execution unit 29 read and write their results to a general purpose architectural register file 31 and to a first rename buffer 32. Floating-point execution unit 30 and load/store execution unit 29 read and write their results to a floating-point architectural register file 33 and to a second rename buffer 34.

In operation of data processor 10, branch unit 26 determines what sequence of program instructions is appropriate given the contents of certain data registers and the program steps themselves. The completion/dispatch unit 27 issues the individual instructions to the various execution units 28, 29, and 30. Each of the execution units performs one or more instructions of a particular class of instructions, i.e., fixed, floating or load/store.

Fixed-point execution unit 28 returns the results of its operations to designated entries in first rename buffer 32, which periodically updates an entry of GPR file 31 with an entry from the first rename buffer 32 when all instructions preceding the instruction that generated the result have updated their GPR fie entries. Completion/dispatch unit 27 coordinates this updating. Both the first rename buffer 22 and the GPR file 31 can supply operands to fixed-point execution unit 28. Conversely, floating-point execution unit 30 returns the results of its operations to designated entries in second rename buffer 34, which periodically updates an entry of FPR file 33 with an entry in second rename buffer 34 when all instructions preceding the instruction that generated the result have updated their FPR file entries. Completion/dispatch unit 27 also coordinates this updating. Both second rename buffer 34 and FPR file 33 supply operands to floating-point execution unit 30.

Load/store unit 29 reads data stored in GPR file 31, first rename buffer 32, FPR file 33 or second rename buffer 34 and writes the selected data to data cache 14. This data may also be written to the external memory system, i.e., main memory 21, secondary cache 16, etc., depending upon the operating characteristics of the data processor 10. Conversely, load/store unit 29 reads data stored in data cache 14 and writes the read data to GPR file 31, first rename buffer 32, FPR file 33, or second rename buffer 24.

In general, the data processor 10 is a reduced instruction set computer ("RISC"), and achieves high performance by pipelining, i.e., breaking each instruction into a sequence of smaller steps, each of which may be overlapped in time with steps of other instructions.

In the example embodiment, each instruction is broken into as many as five discrete steps: fetch, dispatch, execute, write-back, and completion. Memory management circuitry (shown in FIG. 2) within the instruction cache 15 retrieves one or more instructions beginning at a memory address identified by branch unit 26 during the fetch phase. Completion/dispatch unit 27 routes each instruction to the appropriate execution unit after determining that there are no impermissible data dependencies and after reserving a rename buffer entry for the result of the instruction in the dispatch phase. Each particular execution unit executes its programmed instruction during the execution phase and writes its result, if any, to the reserved rename buffer entry during the write-back phase. Finally, completion/dispatch unit 27 updates the architectural register files with the result of a particular instruction stored in a rename buffer after every instruction preceding the particular instruction has so updated the architectural register file. Generally, each instruction phase takes one machine clock cycle. However, some instructions require more than one clock cycle to execute while others do not require all five phases. There may also be a delay between the write-back and completion phases of a particular instruction due to the range of time which the various instructions take to complete.

Figure 2:
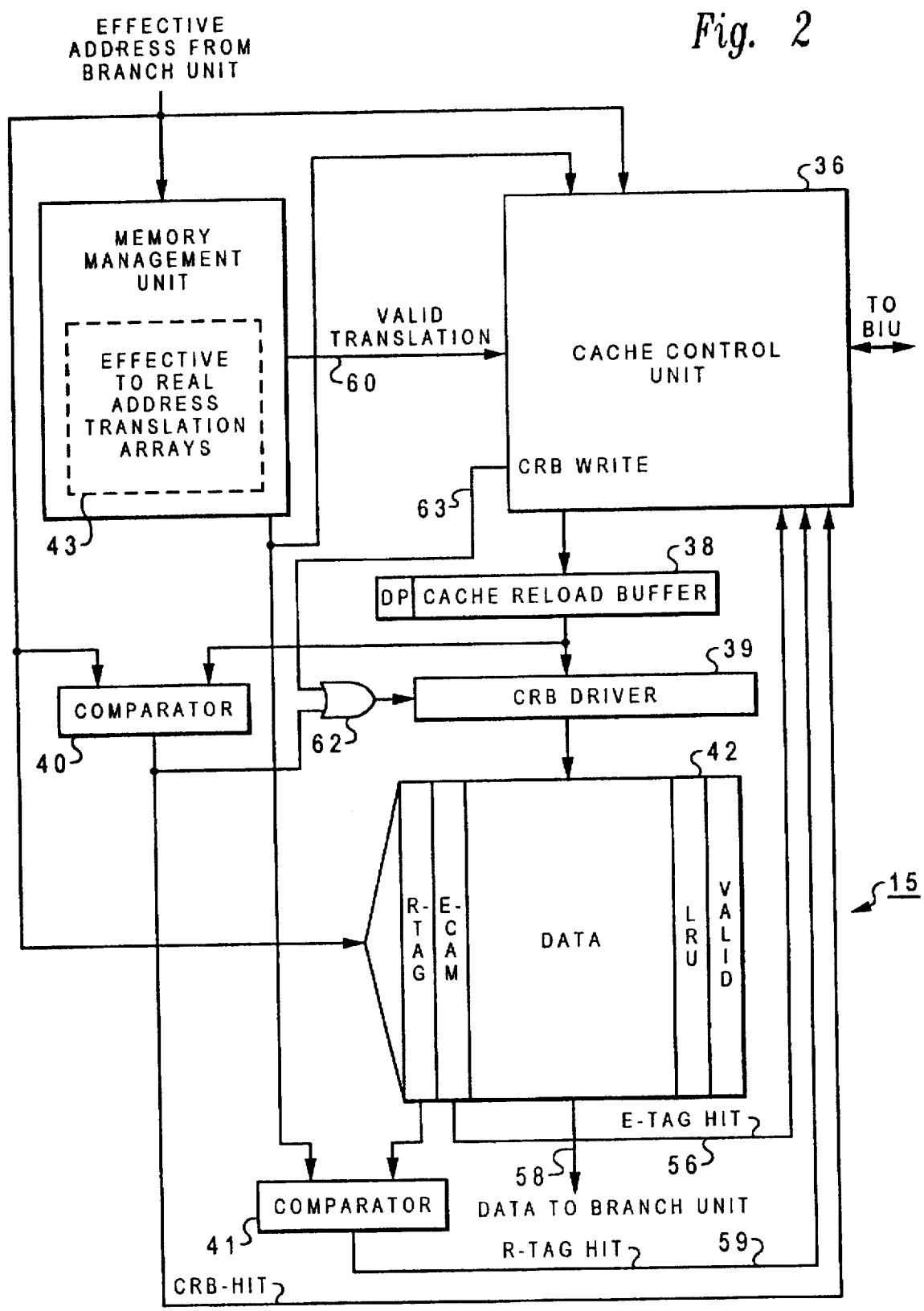
FIG. 2 is a diagram of an instruction cache used in the system of FIG. 1, in accordance with an embodiment.

FIG. 2 depicts a block diagram of the instruction cache 15 of FIG. 1. Instruction cache 15 has a memory management unit (hereafter "MMU") 36, a cache control unit 37, a cache reload buffer (hereafter "CRB") 38, a cache reload buffer driver (labeled and hereafter "CRB driver") 39, a first comparator 40, a second comparator 41, and an instruction cache array 42. MMU 36 contains one or more translation arrays 43 which map received effective addresses from branch unit 26 to real addresses. In the example embodiment, the addresses of data and instructions are indexed within data processor 12 with a first addressing system, an "effective address." The same addresses are indexed outside of data processor 12 with a second addressing system, a "real address."

Figure 3:
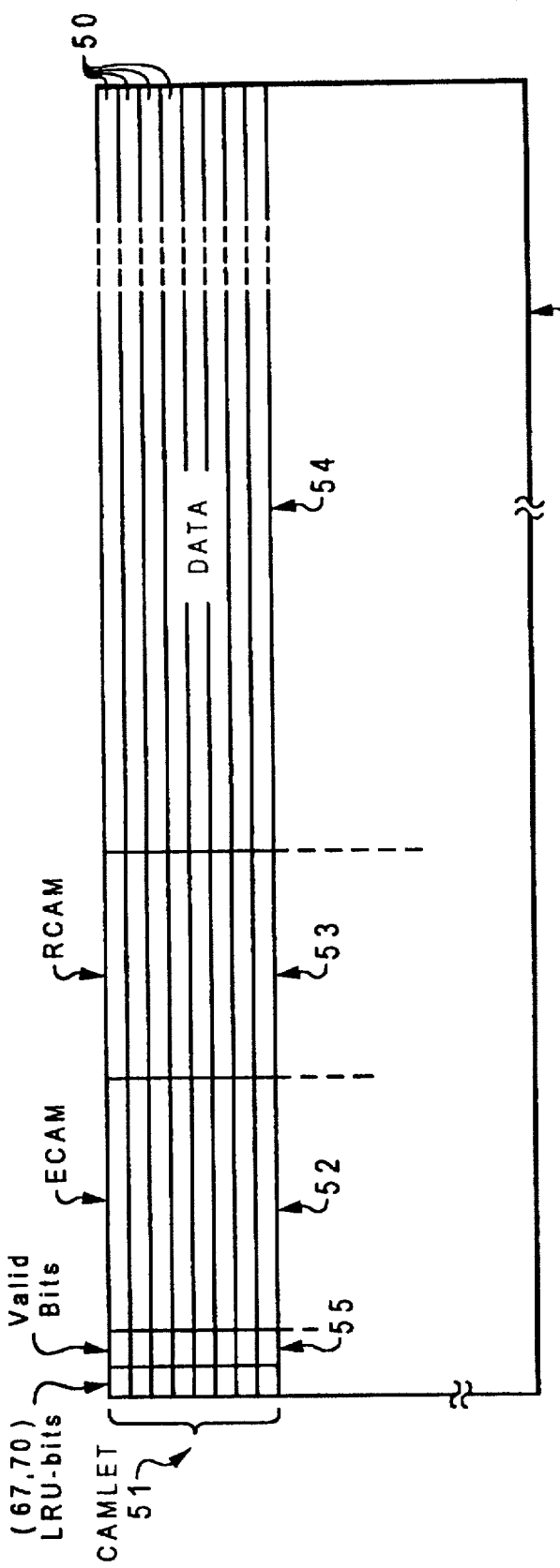
FIG. 3 is an enlarged view of one of the subarrays of the instruction cache of FIG. 2.

As seen in FIG. 3, array 42 is a semi-associative cache which acts like an eight-way set associative cache. Array 42 contains 512 cache lines 50 that each store four quad-words of instructions (sixteen instructions). The 512 cache lines 50 are organized into two banks of thirty-two camlets 51. Each camlet 51 contains eight cache lines 50. Every four quad-words (a cache line) of data may be mapped into one of the eight different cache lines 50 in a particular camlet 51. Each cache line 50 in array 42 has an R-tag field 52 (at least part of which may be a CAM), a E-tag field 53 (in this case a CAM, labeled "E-cam"), four quad-words of instructions 54 (labeled "DATA") and a valid bit 55. Each R-tag 52 stores the twenty-eight most significant bits of the real address of the cache line entry. Each E-tag in the ECAM 53 stores eight bits of the effective address of the cache line entry. Each valid bit 55 indicates whether or not the instructions stored in the cache line are valid.

Figure 4:
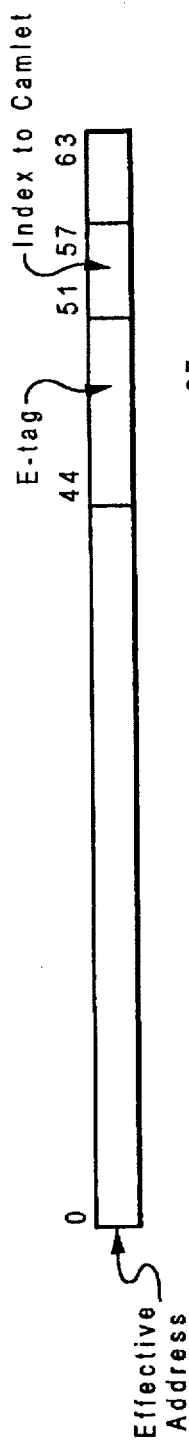
FIG. 4 is a diagram of the format of addresses applied to the instruction cache of FIG. 2 by a processor.

In operation, as illustrated in FIG. 4, the instruction cache 15 of FIG. 3 receives a sixty-four-bit effective address (EA0–EA63, most significant bit to least significant bit) from branch unit 26 each clock cycle (the address does not always change between subsequent clock cycles). This effective address is received by a memory management unit or MMU 36 which translates EA0–EA51 into the twenty-eight most significant bits (RA0–RA27) of the corresponding real address (RA0–RA39, most significant bit to least significant bit). Array 42 selects a single cache line 50 as MMU 36 performs its effective-to-real translation. Array 42 indexes into one camlet 51 using the field EA52–EA57 while attempting to match EA44–EA51 with one of the eight E-tags 53 in the selected one camlet.

If array 42 finds an E-tag match in the one camlet 51, then the matching E-cam asserts a control signal E-TAG HIT on line 56 to cache control unit 37. The associated cache line 50 will output 4-of-16 of its sixteen instructions to branch unit 26 via lines 58. Other circuitry in instruction cache 19 selects the four of sixteen instructions using bits EA58–EA61. At this point, the E-tag hit is only a possible hit. A second comparator 41 determines if each E-tag hit is an actual cache hit. Second comparator 41 receives RA0–RA27 from MMU 36 and the contents of the R-tag 52 from the matching cache line 50 from array 42. Second comparator 41 asserts a control signal R-TAG HIT on line 59 if the two bit fields are identical, a cache hit. MMU 36 asserts a control signal VALID TRANSLATION on line 60 when it translates an effective address into a real address. Cache control unit 37 ignores an R-tag hit if MMU 36 does not assert VALID TRANSLATION. Second comparator 41 de-asserts R-TAG HIT if the two bit fields differ, a cache miss. In this case, cache control unit 37 forwards a request for the four quad-words beginning at the forty-bit real address generated by concatenating RA0–RA27 and EA52–EA63 to BIU 25, so a memory fetch can be sent out to the secondary cache, and, if necessary, to the main memory 21. If an instruction cache access generates an E-tag HIT and an R-tag miss, then a cache alias (1-Meg offset) condition may be created when BIU 25 returns the requested instructions. For this reason, the 1-Meg offset detection of U.S. Pat. No. 5,550,995 is used.

If array 42 does not find an E-tag match in the one selected camlet, then a cache miss occurs and no cache line will assert E-TAG HIT. No further computation is required. In this case, cache control unit 37 also forwards a request for the four quad-words beginning at the forty-bit real address generated by concatenating RA0–RA27 and EA52–EA63 to BIU 25. No cache alias will be created in this case when BIU 25 returns the requested instructions. The cache line 50 for writing the replacement line in case of either type of case miss is selected based on a replacement algorithm.

If the replacement algorithm for the semi-associative instruction cache 15 of FIGS. 1–4 used only LRU, and no provision was made for checking for invalid entries, a compromise in performance would result, as noted above. Checking for all invalidated entries, however, would require more chip area and more gate-delays, so performance and economy would be diminished. Thus, a trade-off is made, resulting in a smaller (in chip area) implementation that is nevertheless of high performance. The 1-Meg invalidation (due to the 8-bits of the ECAM 53 having to be unique within each caroler 51) happens to any kind of entry, new or old. Thus, in the replacement method according to this embodiment, invalidations due to the 1-Meg invalidation are accounted for, but the invalidations due to snoops are ignored as a minor performance impediment. Taking into account 1-Meg invalidations requires addition of only inconsequential chip area for the logic circuitry needed. During the cycle where the 1-Meg scenario is detected, the instruction cache arranges the LRU bits so that the next replacement points to the entry that was just invalidated by the 1-Meg problem, i.e., the opposite of LRU so it is termed "most recently used" or MRU. Normally, the LRU bits get updated due to the wordline being active during this cycle, but by just inverting the update LRU bits during the 1-Meg scenario, the bits automatically point to the line that is just being invalidated. Implementing this replacement method uses circuitry that results in a very small chip area increase from the previous replacement logic, and yet ensures that the invalidated entry (cache line 50) is replaced next, instead of it being considered a "recently used" entry and getting replaced last.

According to the illustrated embodiment, in the semi-associative instruction cache 15, with the ECAM 52 and eight lines grouped together to form camlets 51, a binary index is used to address one camlet 51 in the array 42, and the ECAM match is used to select a potential line within the camlet in accessing data stored in the cache array 42. Since an ECAM match causes that cache line's wordline to activate, proper cache operation requires that no two (or more) ECAMs 53 within a camlet 51 have the same match criteria or ECAM entry; the invalidation of entries as described in U.S. Pat. No. 5,550,995 is done to prevent this from happening. Due to the mapping of the EA into the ECAM tag 52 and the camlet binary index, addresses that are 1-Meg apart point to the same camlet and have the same ECAM tag.

Figure 5:
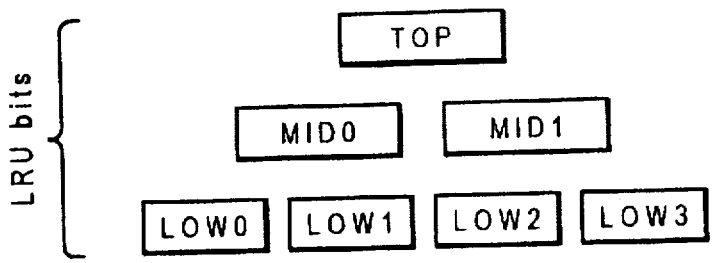
FIG. 5 is a diagram of LRU bits used in the instruction cache of FIGS. 2-4, according to the illustrated embodiment.
Figure 5:
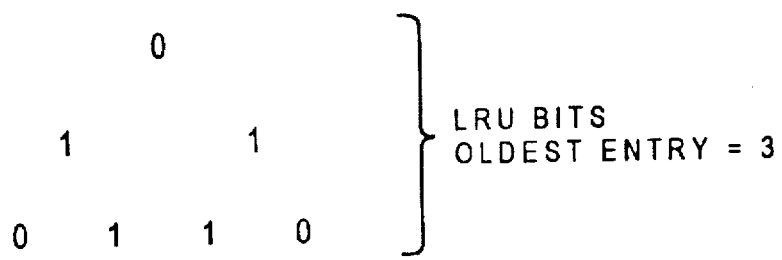
Figure 5:
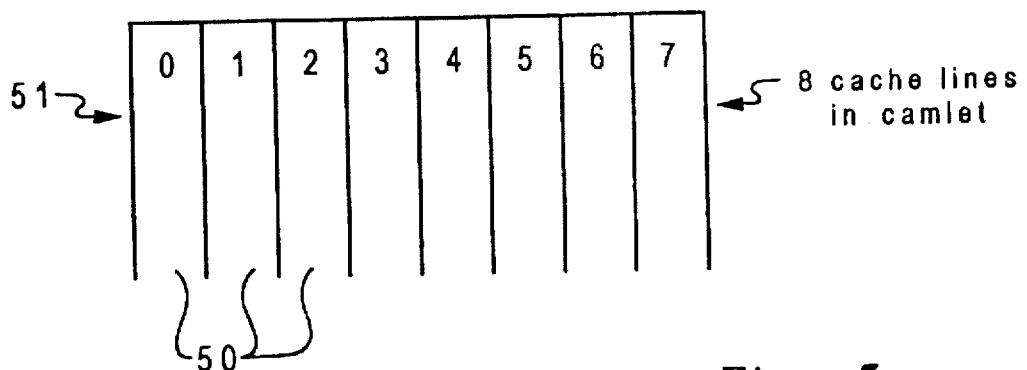

To determine which cache line to replace within a camlet, the processor of FIGS. 1–4 uses a tree pseudo-LRU replacement algorithm. As seen in FIG. 5, seven bits are used for each camlet, these being stored in the area of the camlet, and these bits my be thought of a being in a tree arrangement, 1-top, 2-middle, 4-bottom, also referred to as TOP, MID0, MID1, and LOW0–LOW3, in FIG. 5. These bits indicate which entry is the oldest out of the eight lines 50 in a camlet 51; a set of these seven LRU bits are included in each camlet in the array 42, distributed in the eight cache lines of a camlet. A value of 0 for the top bit would show that the left side (entries 0, 1, 2, 3 of the camlet) has the oldest entry, while a value of 1 for the top bit would indicate the opposite, i.e., the right side (4, 5, 6, 7) has the oldest entry. The middle bits MID0 and MID1 select between 0, 1 and 2, 3, or 4, 5 and 6, 7, all as illustrated in the Table of FIG. 5. In a numerical example shown at the top of FIG. 7, the oldest entry is 3, because the top bit is 0 indicating left side, the second row left bit MID0 is 1 indicating 2 or 3, and the bottom row bit LOW1 is 1 indicating 3. Thus, LRU bits point to one of the eight cache lines 50 in a camlet 51 for the next replacement.

Referring to FIGS. 6a and 6b, the cache line to replace in a camlet is given for all combinations of LRU bits, and also the setting of LRU bits for a cache hit on each cache line. Note that only three bits determine which cache line is replaced, and that only three bits (the same three as for replacement) are set for a given cache hit. Note also that the three bits are of reversed 1's and 0's, comparing "replace" vs. "hit." The remaining bits, other than the three involved in a cache hit or replacement, are all "x" meaning "don't care. These four don't-care bits are not changed by a hit and are immaterial in a replacement, but are useful to keep the LRU data for later replacements.

Figure 7:
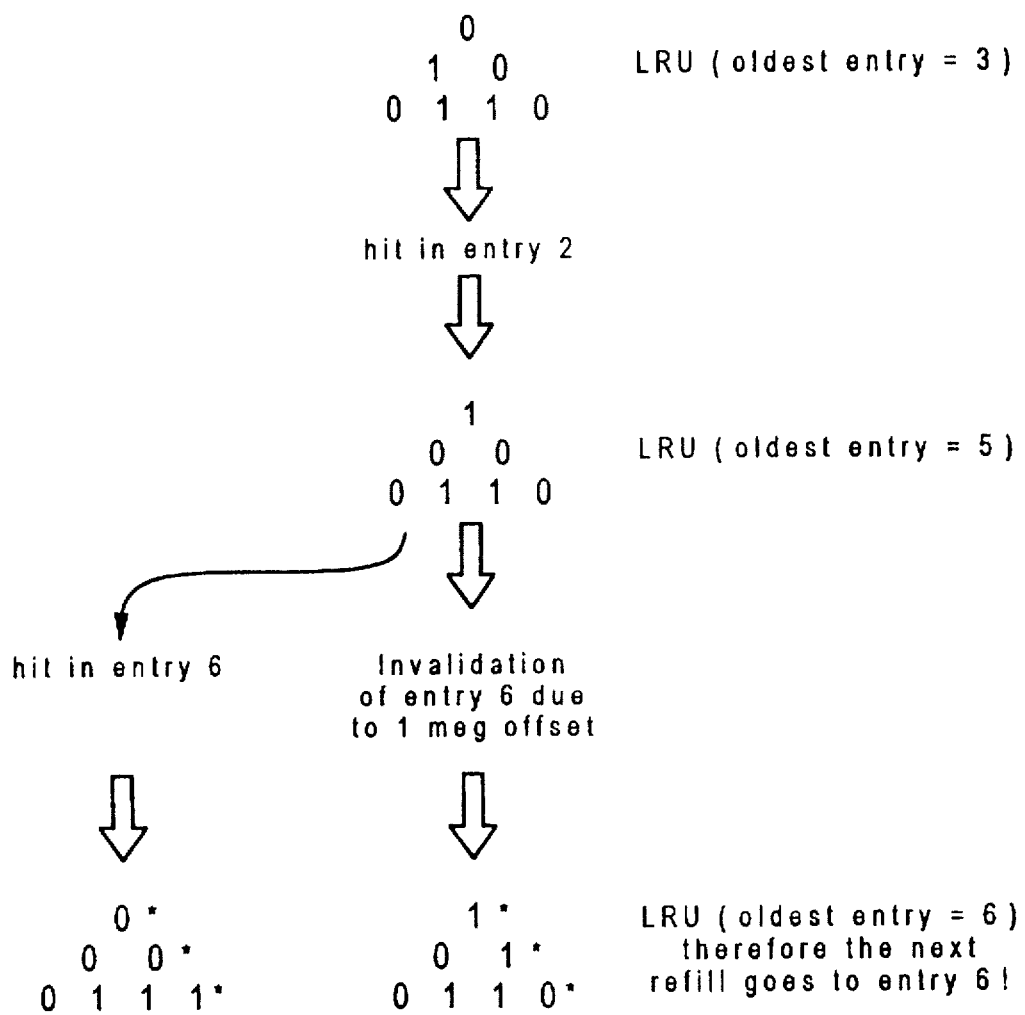
FIG. 7 is a diagram of the LRU bits of FIGS. 5 and 6 under illustrative replacement scenarios.

In the numerical example at the top of FIG. 7, if there is a cache hit in entry 2 (cache line 2) in this camlet, indicated by the wordline for this cache line going high, this will mean entry 2 should be not used for the next replacement. Before this hit on entry 2, the LRU indicated by the bits was 3. It is seem that the implemented replacement algorithm is pseudo-LRU, however, since the apparent LRU entry changes from 3 to 5 when there is a hit on 2 for FIG. 7; more precisely the algorithm causes replacement of one of the less-recently-used entries, not, strictly speaking, the least-recently-used entry.

The LRU bits of the tree of FIGS. 5 or 6a–6b are updated on hits and refills or whenever a wordline is activated. FIG. 7 gives an example of what happens to the LRU bits during a simple ECAM hit vs. an invalidation due to 1-Meg offset. As noted above, a cache hit for entry 2 (top part of Figure) causes the LRU oldest-entry indication to go from 3 to 5, by the top bit being toggled from 0 (left side) to 1 (right side). Then, with the LRU bits in this condition (LRU=5) a hit for entry 6 for a routine cache hit operation, as illustrated on the left-hand path 65, results in the top bit being toggled to 0, forcing the next replacement away from 6 to the 0, 1, 2, 3 side (pointing to 1 in this case). The central path 66 in FIG. 7 shows what happens if (instead of a hit for entry 6) there is an invalidation of entry 6 due to the 1-Meg offset scenario as described above. The object here is to point to 6 for the next refill operation. This is accomplished by inverting each of the bits affected by the wordline for entry 6 going high, as seen in FIG. 6b and as indicated by asterisk in FIG. 7, i.e., the top bit and the other two right-most bits MID1 and LOW3. So, an invalidation of entry 6 caused by a 1-Meg offset scenario, even though it would have (without the feature of the invention) resulted in entry 6 being named as the LRU, instead results in the next replacement going to entry 6.

Figure 8:
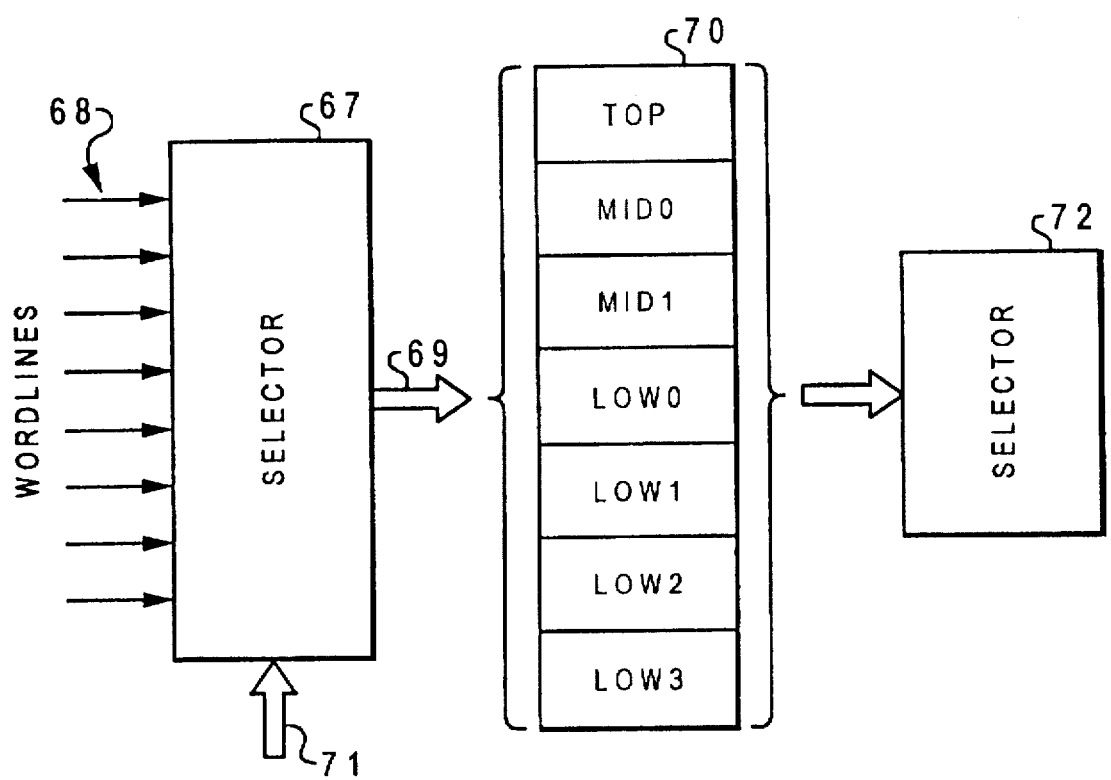
FIG. 8 is a diagram of a circuit for setting and responding to the LRU bits in the cache described in reference to FIGS. 2-7.

A circuit for implementing the LRU/MRU replacement method is illustrated in FIG. 8. A selector 67 receives as inputs 68 the eight wordlines for the eight cache lines 50 of a caroler, and generates the three new bits of FIGS. 6a or 6b for driving the seven LRU bits of FIGS. 5–7 in latches via output 69. Control inputs 71 from the cache controller 37 indicate whether this is a cache fill, a cache hit, or a 1-Meg offset operation. A selector circuit 72 is responsive to the seven LRU bits in latches 70 to select one of seven cache lines for replacement. It is important to note that when a wordline is activated to write to a cache line, or to invalidate this line (the valid bit 55 is located in the cache line 50), the LRU bit selector arrangement of FIG. 8 is activated, i.e., were it not for the feature of the invention the invalidation would name the invalidated line for the next replacement. So, if a 1-Meg offset invalidation is taking place, the circuit of FIG. 8 inverts the three bits to be the opposite of what they would otherwise be.

While the invention has been particularly shown and described with reference to a preferred embodiment, it will be understood by those skilled in the art that various changes in form and detail may be made therein without departing from the spirit and scope of the invention.

What is claimed is:

1. A method of operating a cache memory comprising the steps of:

storing data in a plurality of lines in said cache memory, the plurality of lines being configured in groups of a selected number of lines, storing an indication for each said group of which one of said selected number is least-recently-used, in an operation of writing to said cache memory, detecting whether or not a line to be written has a tag matching a line that is already in a group, and if so, invalidating said line already in said group, and indicating said line already in said group as least-recently-used, and if not, replacing a line in the group indicated by said least-recently-used indication.

2. A method according to claim 1 wherein said cache is a semi-associative cache, and said tag is stored in a content-addressable memory (CAM).

3. A method according to claim 2 wherein said operation of writing includes selecting a line in said group based on an address for said line to be written.

4. A method according to claim 3 wherein said step of invalidating includes activating said line already in said group.

5. A method according to claim 4 wherein said step of indicating said least-recently-used line is done in response to activation of lines of said group.

6. A cache memory system, comprising:

a cache memory array storing data in a plurality of lines, the of plurality of lines being configured in groups of a selected number of lines, an indicator stored for each group of which one of said selected number was least-recently-used, writing circuitry for said cache lines detecting whether or not a line to be written has a tag matching a line that is already in a group, and if so, invalidating said line already in said group, and indicating said line already in said group as least-recently-used, and if not, replacing a line in the group indicated by said least-recently-used indication.

7. A system according to claim 6 wherein said cache is a semi-associative cache, and said tag is stored in a content-addressable memory (CAM).

8. A system according to claim 7 wherein said writing circuitry selects a line in said group based on an address for said line to be written.

9. A system according to claim 8 wherein said invalidating includes activating said line already in said group.

10. A system according to claim 9 wherein said indication of said least-recently-used line is done in response to activation of lines of said group.

* * * * *